United States Patent [19]
Lee

[11] Patent Number: 5,920,052
[45] Date of Patent: Jul. 6, 1999

[54] MULTI-CIRCUIT SWITCH GEAR

[75] Inventor: Seok Won Lee, Chungcheongbuk-Do, Rep. of Korea

[73] Assignee: LG Industrial Systems Co., Ltd., Seoul, Rep. of Korea

[21] Appl. No.: 08/998,659

[22] Filed: Dec. 29, 1997

[30] Foreign Application Priority Data

Dec. 31, 1996 [KR] Rep. of Korea ................ 96/79150

[51] Int. Cl.$^6$ ................................................ H01H 33/66
[52] U.S. Cl. ........................ 218/119; 218/139; 218/152
[58] Field of Search ............................ 218/118, 119, 218/120, 139, 140, 141, 142, 146, 152, 153, 154, 155; 174/151, 152 R

[56] References Cited

U.S. PATENT DOCUMENTS

| | | | |
|---|---|---|---|
| 3,551,587 | 12/1970 | Propst | 174/18 |
| 3,947,650 | 3/1976 | Strain et al. | 218/154 |
| 4,798,922 | 1/1989 | Roberts | 200/400 |
| 5,508,486 | 4/1996 | Spack et al. | 218/3 |
| 5,600,112 | 2/1997 | Opfer | 218/154 |

*Primary Examiner*—Lincoln Donovan

[57] ABSTRACT

A multi-circuit switch gear includes a main body filled with an insulation gas, main bushings mounted on a front portion of the main body, a plurality of three-phase input/output units connected to the main bushings, multi-position switching devices disposed inside the main body for switching between a turn-on state, a turn-off state, and an earthed stated, automatic contact devices disposed at a front surface portion of the main body, earth bushings mounted on the respective side portions of the input/output units, moldcone connection members coupled to the earth bushings, and earth terminals connected to the moldcone connection members. The multi-circuit switch gear allows a current discharge operation to occur in the insulation gas provided in the main body during the earthing operation, thereby increasing workers' safety and facilitating an insulation test via the connection members with regard to the underground insulation cable.

18 Claims, 14 Drawing Sheets

TURN-ON STATE

TURN-OFF STATE

EARTHED
STATE

MULTI-CIRCUIT SWITCH GEAR

BACKGROUND OF THE INVENTION

1. Field of the Invention

The present invention relates to a switch gear, and more particularly to an improved multi-circuit switch gear which guides a current discharge operation to occur in the insulation gas provided in a main body during an earth operation at a designated interval of a power distributing line, thereby securing workers' safety and facilitating an earthing operation with regard to an underground insulation cable.

2. Description of the Background Art

A general multi-circuit switch gear is used for a power distribution system including an overhead power distributing line and an underground power distributing line, and allows an electrical power to apply therethrough to power receiving devices for a plurality of power consumers.

As shown in FIGS. 1 and 2, such a conventional multi-circuit switch gear is provided with: a main body 10 in which a power switching operation is carried out; a plurality of main bushings 20 including a plurality of input bushings 20a disposed at a portion of the main body 10 and receiving power therethrough and a plurality of output bushings 20b for supplying the power received through the input bushings 20a to respective power consumers.

A plurality of cables 30 for allowing the power to flow to and from the main bushings 20 are correspondingly connected to terminal connection kits 40 which are coupled to the main bushings 20.

A plurality of manipulating handles 50 are disposed at an upper portion of the main body 10 so that a switching actuator (not shown) provided in the main body 10 may be manually operated for switching a position of a conductor in the switch gear.

With reference to FIGS. 3A and 3B, the structure and operation of the terminal connection kits 40 connected to the main bushings 20 will now be described.

Into the terminal connection kits 40, the main bushing 20 provided at the main body 10 is inserted into an end portion of a T-type elbow valve connector 60, and a connection terminal 61 coupled to a cable adaptor 62 is inserted up into another end portion of the T-type valve connector 60 coupled thereto by the main bushing 20, whereby the connection terminal 61 is coupled to the main bushing 20.

A connection plug 63 is horizontally inserted into a third end portion of the elbow connector 60 which receives the main bushing 20 and the connection terminal 61, and the main bushing 20 connected to the connection terminal 61 therein receives therein an end portion of the connection plug 63. Another end portion of the connection plug 63 is housed in an insulation cap 64.

As shown in FIG. 4, the circuit composition of the conventional multi-circuit circuit switch gear will now be explained.

First, a circuit under a three-phase input/output pattern may vary from other switch gear circuits, so that although circuit compositions of $[(A_1, B_1, C_1), (A_2, B_2, C_2)]$ will be described below, but others such as $[(A_3, B_3, C_3), (A_4, B_4, C_4), (A_*, B_*, C_*)]$ are known in the art. Here, * denotes a natural number.

The circuit of the conventional multi-circuit switch gear includes a 2-position contact for supplying and breaking the power. An input unit $(A_1, B_1, C_1)$ with regard to respective phases A, B, C is formed into a single circuit, and respective output units $(A_2, B_2, C_2), (A_*, B_*, C_*)$ are formed into other circuits.

As shown in FIGS. 5A and 5B, a breaking operation of the conventional multi-circuit switch gear for performing a maintenance or regular checkup by interrupting an electrical flow will now be explained. Here, 20a First, 22 denotes an opposite end portion of the main bushing disposed in the main body 10.

By an interruption operation of the manipulating handle 50 in order to break a current flow in the multi-circuit switch gear, a movable contact 66 is separated from a fixed contact 65 as shown in FIG. 5A, thereby activating the current interruption.

However, although the current flow from the main body 10 is interrupted, there remains, in the main bushing 20, a charged current that come in from the cable 30 connected to an exterior of the main body 10.

As shown in FIGS. 6A and 6B, an earthing operation for earthing the charged current remaining will now be described.

First, a connection plug 63 is externally exposed by removing an insulation cap 64 covering an end portion of the elbow connector 60 by use of an insulation stick 67.

Then, a protrusion 70a extended from an end portion of an earthing elbow 70 is momentarily inserted into an insertion hole (not shown) formed in an end portion of the exposed connection plug 63, thereby completing the earthing operation.

However, the conventional multi-circuit switch gear employs a two-position operation method according to its switching operation, so that it is required to disassemble the terminal connection kit while earthing the cable.

Further, there may occur a safety accident to a worker while an arc discharge is being carried out at an end portion of the cable through the terminal connection kit in the air.

SUMMARY OF THE INVENTION

Accordingly, it is an object of the present invention to provide a multi-circuit switch gear which guides a current discharge operation to occur in the insulation gas provided in a main body during an earth operation at a designated area of a power distribution line by providing 3-position contact points including open, close and ground points, thereby securing workers' safety and facilitating an earthing operation with regard to an underground insulation cable.

To achieve the above-described and other objects, there is provided a multi-circuit switch gear according to the present invention which includes a main body filled with an insulation gas of $SF_6$, a plurality of main bushings mounted on a front side of the main body, a plurality of three-phase input/output units connected to the main bushing, a plurality of multi-position devices disposed inside the main body and connected to the constant power source bushing so as to correspond to the respective phases of the plurality of input/output units, thereby carrying out a plurality of contact operations with regard to an open, close and earth thereof, a plurality of manual contact devices disposed at a front surface portion of the main body and above the respective input/output units so as to operate the multi-position devices, a plurality of earth bushings mounted on respective side portions of the input/output portions and connected to the respective phases of the input/output units, a plurality of moldcon connection means an end portion of each of which is connected to a corresponding one of the earth bushings, and a plurality of earth terminals connected to another end portion of each of the moldcon connection means and earthed underground.

The object and advantages of the present invention will become more readily apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the multi-circuit switch gear according to the present invention will now be described.

Figure 1:
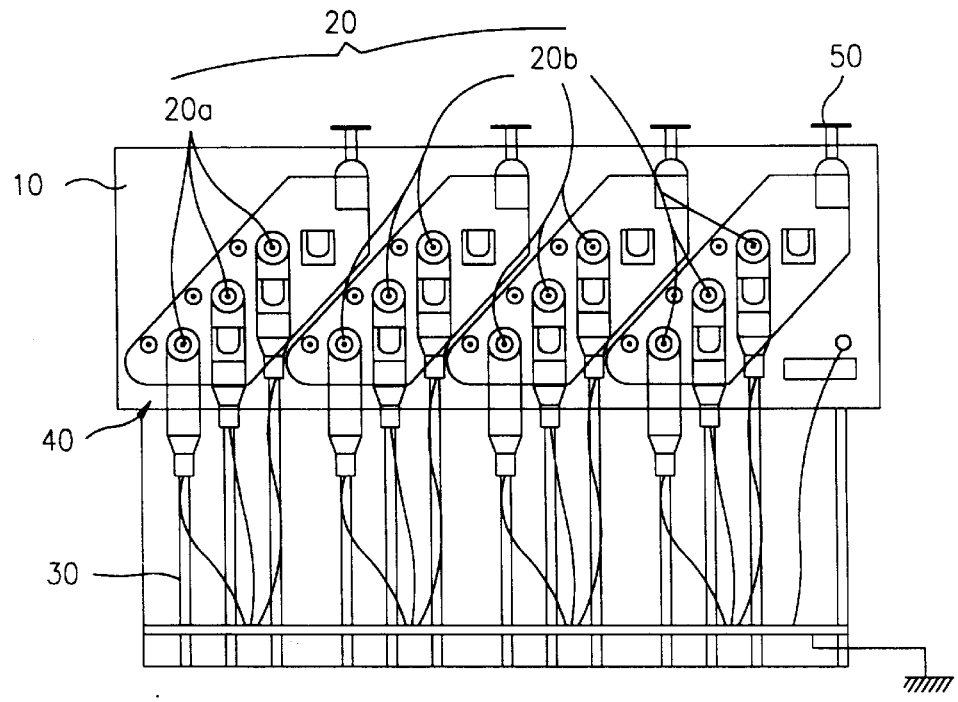
FIG. 1 is a front view illustrating a multi-circuit switch gear according to a conventional art.
Figure 2:
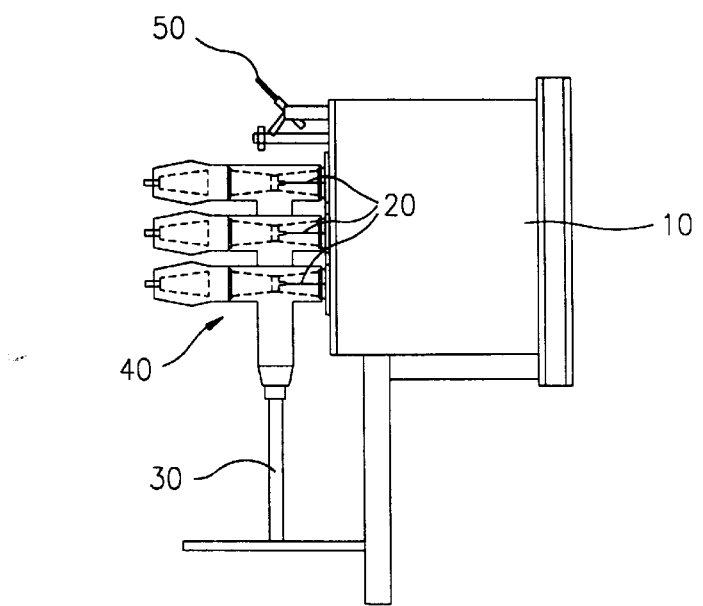
FIG. 2 is a side view illustrating the multi-circuit switch gear according to the conventional art.
Figure 3A:
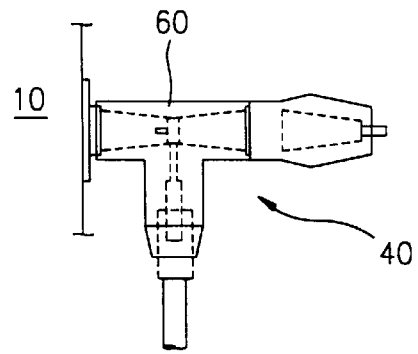
FIG. 3A is a schematic side view illustrating a terminal connection kit of the multi-circuit switch gear according to the conventional art.
Figure 3B:
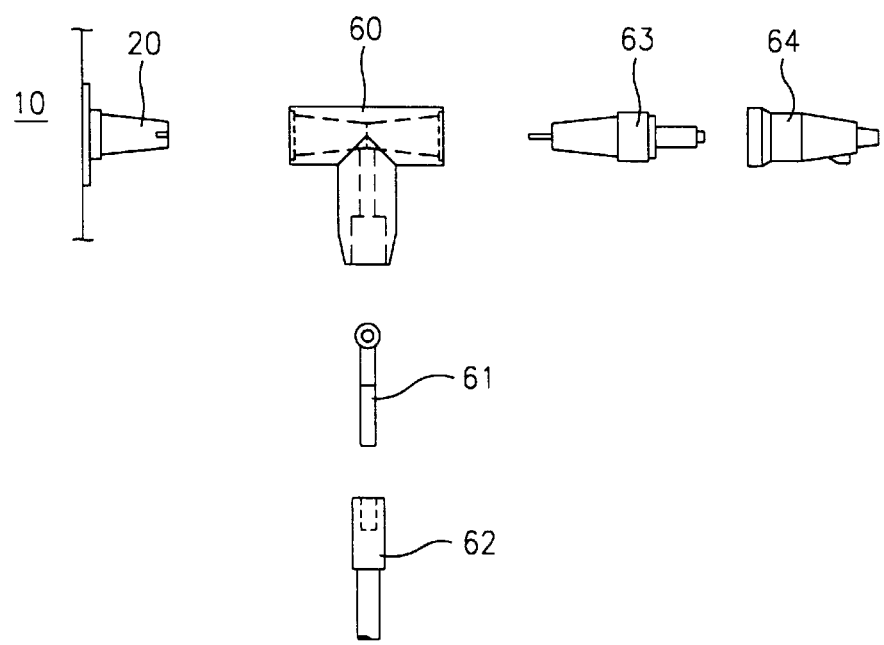
FIG. 3B is an exploded side view illustrating a terminal connection kit of the multi-circuit switch gear according to the conventional art.
Figure 4:
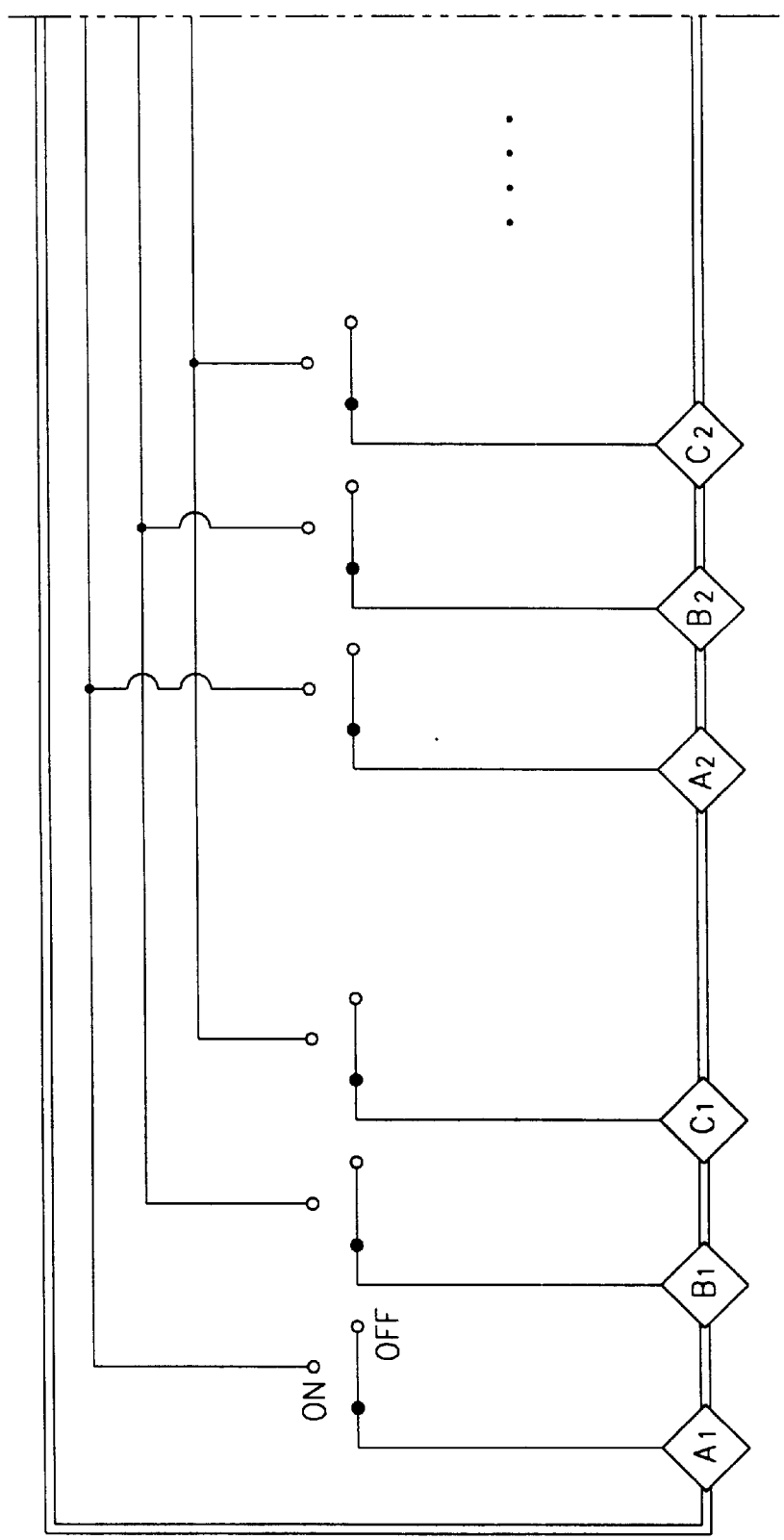
FIG. 4 is a circuit view illustrating the multi-circuit switch gear according to the conventional art.
Figure 5A:
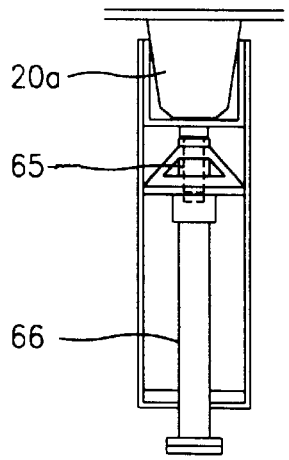
FIG. 5A is a partial cross-sectional view of the conventional multi-circuit switch gear illustrating a state in which current is supplied.
Figure 5B:
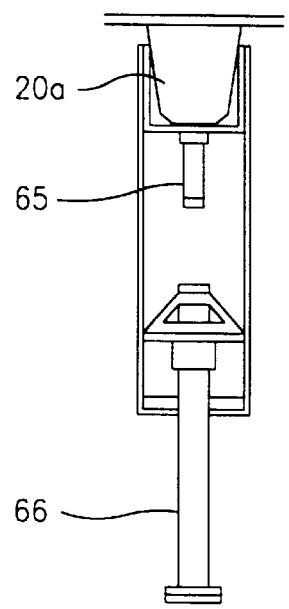
FIG. 5B is a partial cross-sectional view of the conventional multi-circuit switch gear illustrating a state in which current is interrupted.
Figure 6A:
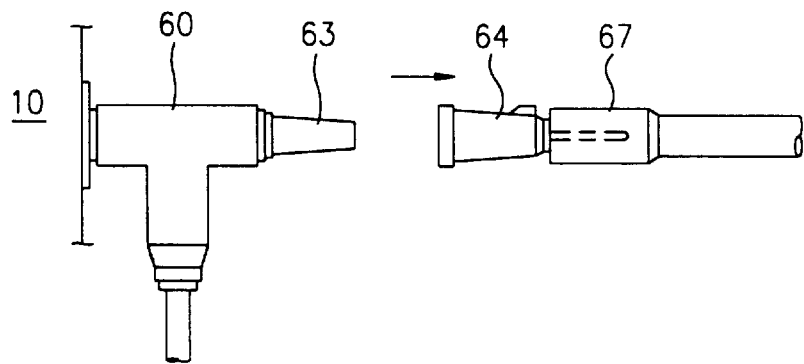
FIG. 6A is a view illustrating a state in which an insulation cap is being separated from the terminal connection kit of the conventional multi-circuit switch gear.
Figure 6B:
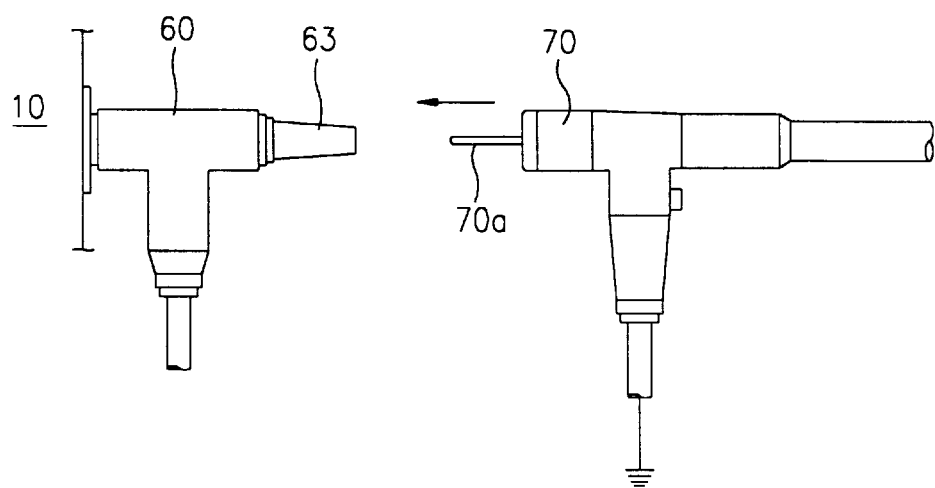
FIG. 6B is a view illustrating a state in which a connection elbow is being inserted into the terminal connection kit of the conventional multi-circuit switch gear.
Figure 7:
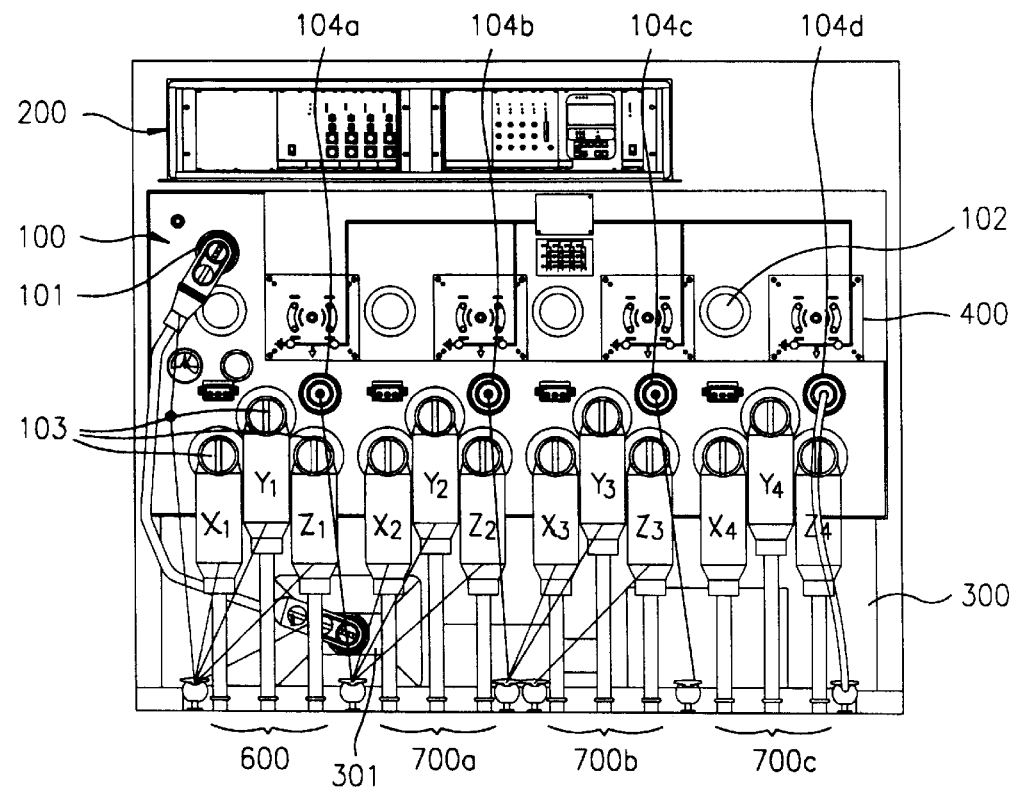
FIG. 7 is a front view illustrating a multi-circuit switch gear according to the present invention.
Figure 8:
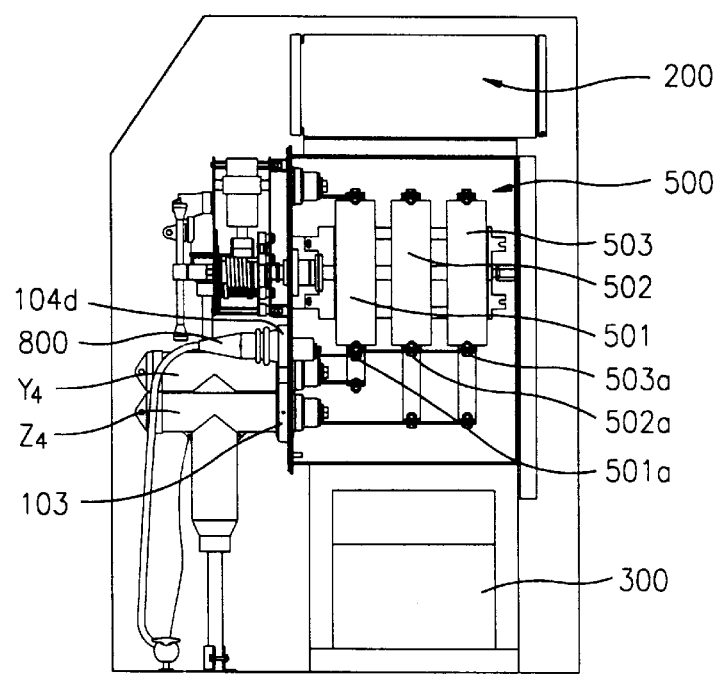
FIG. 8 is a side view illustrating the multi-circuit switch gear according to the present invention.

As shown in FIGS. 7 and 8, the multi-circuit switch gear according to the present invention includes a main body 100 filled with $SF_6$ gas serving as an insulation medium. A control unit 200 for controlling the switch gear is disposed at an upper portion of the main body 100. A driving unit 300 for driving a switching actuator 400 according to a control signal outputted from the control unit 200 so as to operate the 3-position apparatus 500 disposed in the main body 100 is provided in a lower portion of the main body 100.

A charge unit 301 for supplying an electrical power to the driving unit 300 is connected to a constant power source bushing 101 coupled to the constant power source disposed at a front top portion of the main body 100. To a side portion of the constant power source bushing 101 there is provided a plurality of switching actuators 400 for actuating a plurality of switch devices 500.

A viewing window 102 is disposed at a side portion of the switching actuator 400 so as to view with bare eyes the operational state of the three-position switching device 500 which is disposed inside the main body 100 and operated by the switching actuator 400. Below the switching actuator 400 there are disposed an input unit 600, a first output unit 700a, a second output unit 700b and a third output unit 700c, respectively formed of three cables for 3-phase alternating currents (X, Y, Z).

The input unit 600 and the first to third output units 700a, 700b, 700c are connected by a plurality of main bushings to the main body 100, wherein the input unit 600 receives an electrical power and the first to third output units 700a, 700b, 700c respectively supply electrical power to consumers or to other switch gears. Here, reference numerals 104a, 104b, 104c, 104d denote earth bushings.

The respective earth bushings 104a, 104b, 104c, 104d are earthed underground by a moldcone connection member 800.

Also, reference numeral 501 is a Y-phase 3-position switching device, 501a is a Y-phase earth terminal, 502 is an X-phase 3-position switching device, 502a is an X-phase earth bushing, 503 is a Z-phase 3-position switching device, and 503a is a Z-phase earth terminal.

The 3-phase 3-position switching devices 501, 502, 503 are formed in each of the output units 700a, 700b, 700c.

Figure 9A:
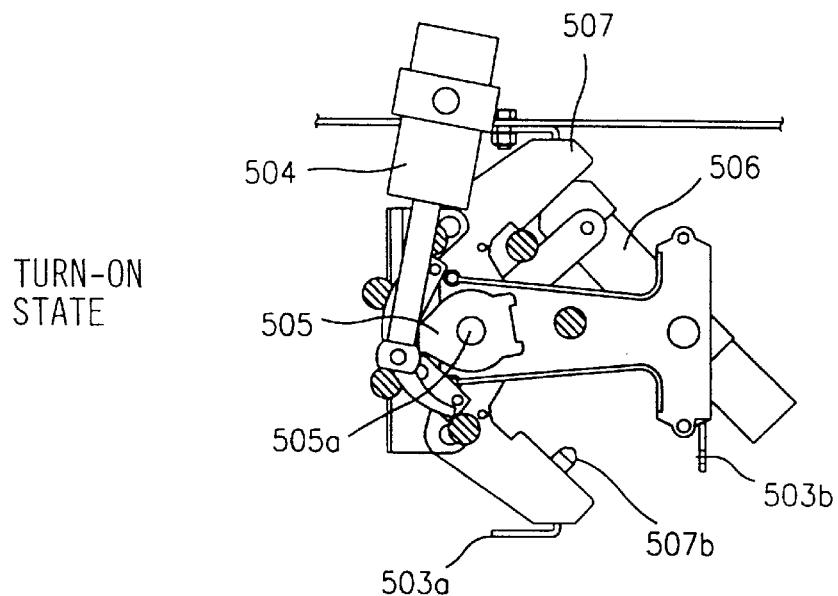
FIG. 9A is an operational view illustrating a 3-position switch device and its actuator of the multi-circuit switch gear in a turn-on state according to the present invention.
Figure 9B:
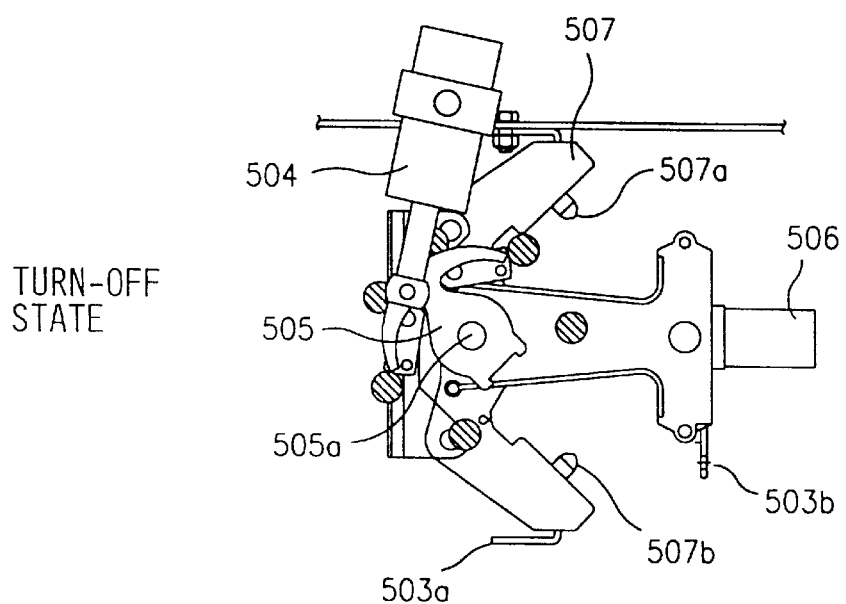
FIG. 9B is an operational view illustrating a 3-position switch device and its actuator of the multi-circuit switch gear in a turn-off state according to the present invention.
Figure 9C:
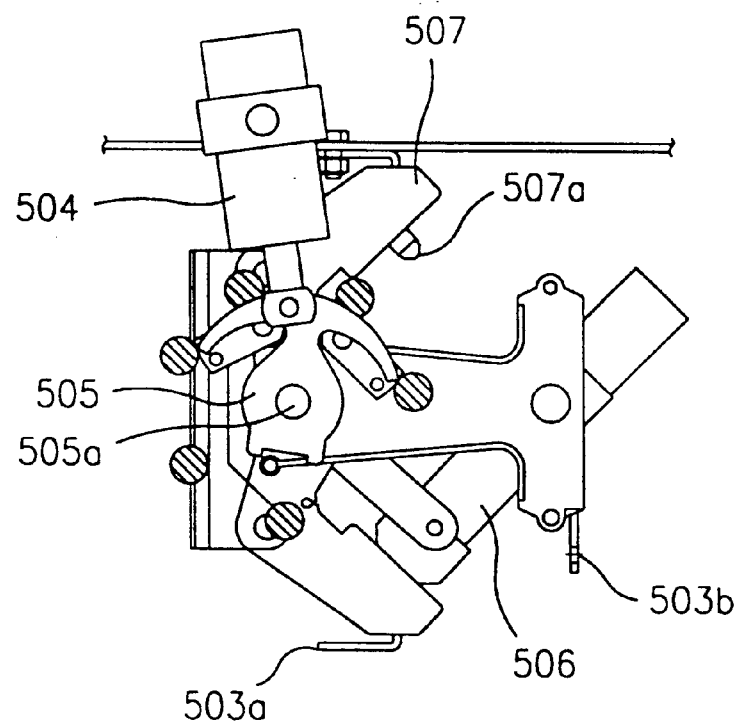
FIG. 9C is an operational view illustrating a 3-position switch device and its actuator in an earthed state thereof of the multi-circuit switch gear according to the present invention.

The Z-phase 3-position switching device 503 of the third output unit 700c among the 3-position switching devices 500 corresponding to the automatic switching actuator 400 of the multi-circuit switch gear moves its contact point to switch to a turn-on state, a turn-off state, and an earth state, and its mechanism will now be described with reference to FIGS. 9A through 9C. The control unit 200 is an apparatus for controlling the switch gear according to a control signal outputted from a monitoring center in accordance with the present invention. The control signal from the control unit 200 is transmitted to the driving unit 300 through a signal line. The driving unit 300 includes, therein for example, an oil pressure pump and a solenoid valve operating in response to the control signal from the control unit 200.

First, when the control signal is received from the control unit 200, the driving unit 300 is operated, and accordingly an oil pressure cylinder 504 in the switching actuator 400 is operated, thereby rotating a control latch 505 to a clockwise direction thereof. In accordance with the operation of the control latch 505, the movable contact member 506 in the switching device 500 coupled to a central shaft 505a of the control latch 505 becomes moved upwardly, thereby being connected to the turn-on fixed contact 507a and being in a turn-on state as shown in FIG. 9A.

Also, when the switch gear is interrupted, the oil pressure cylinder 504 is operated, thereby rotating the control latch 505 to its clockwise direction. Accordingly, the movable contact member 506 coupled to the central shaft 505a of the control latch 505 is downwardly moved to a horizontal position in a turn-off state as shown in FIG. 9B.

When the switch gear is manually manipulated by an operator in order to check up the switch gear for its maintenance and mechanical checkup, the control latch 505 is rotated to its clockwise direction by a manual manipulation of the switching actuator 400. At this time, the conductor 506 coupled to the central shaft 505a of the control latch 505 is downwardly moved and then contacts to the fixed earthed contact 507b extended from a lower portion of the fixed contact actuator 507, thereby being earthed as shown in FIG. 9C.

Figure 10:
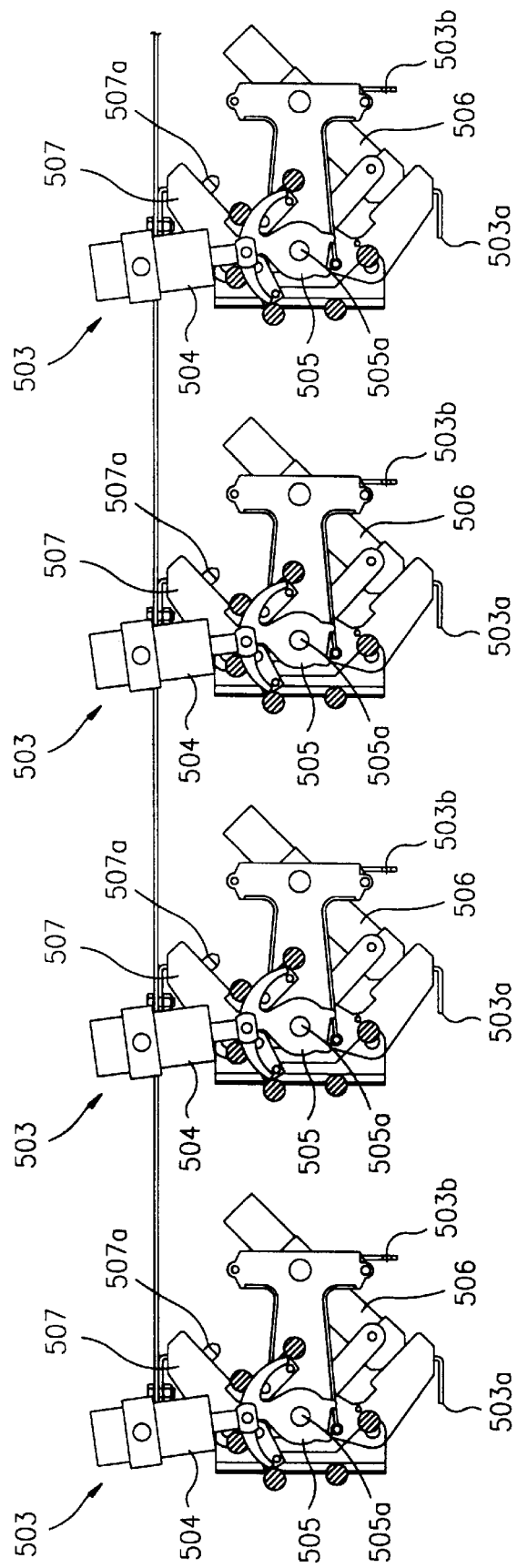
FIG. 10 is a collective earth state view illustrating respective 3-position switch devices and their actuators with regard to input and output units of the multi-circuit switch gear according to the present invention.

The earth state of the Z-phase 3-position switching device 503 with regard to the input unit 600 and the respective output units 700a, 700b, 700c is as shown in FIG. 10.

At this time, in each of the input unit 600 and output units 700a, 700b, 700c, the X-phase and Y-phase 3-position switching devices 501, 502 are disposed behind a corresponding one of the respective Z-phase 3-position switching devices 503. The respective earth states of the X-phase and Y-phase 3-position switching devices 501, 502 are identical to that of the Z-phase 3-position switching device. Here, reference numeral 503b is a connection terminal coupled to the main bushing 103.

Figure 11:
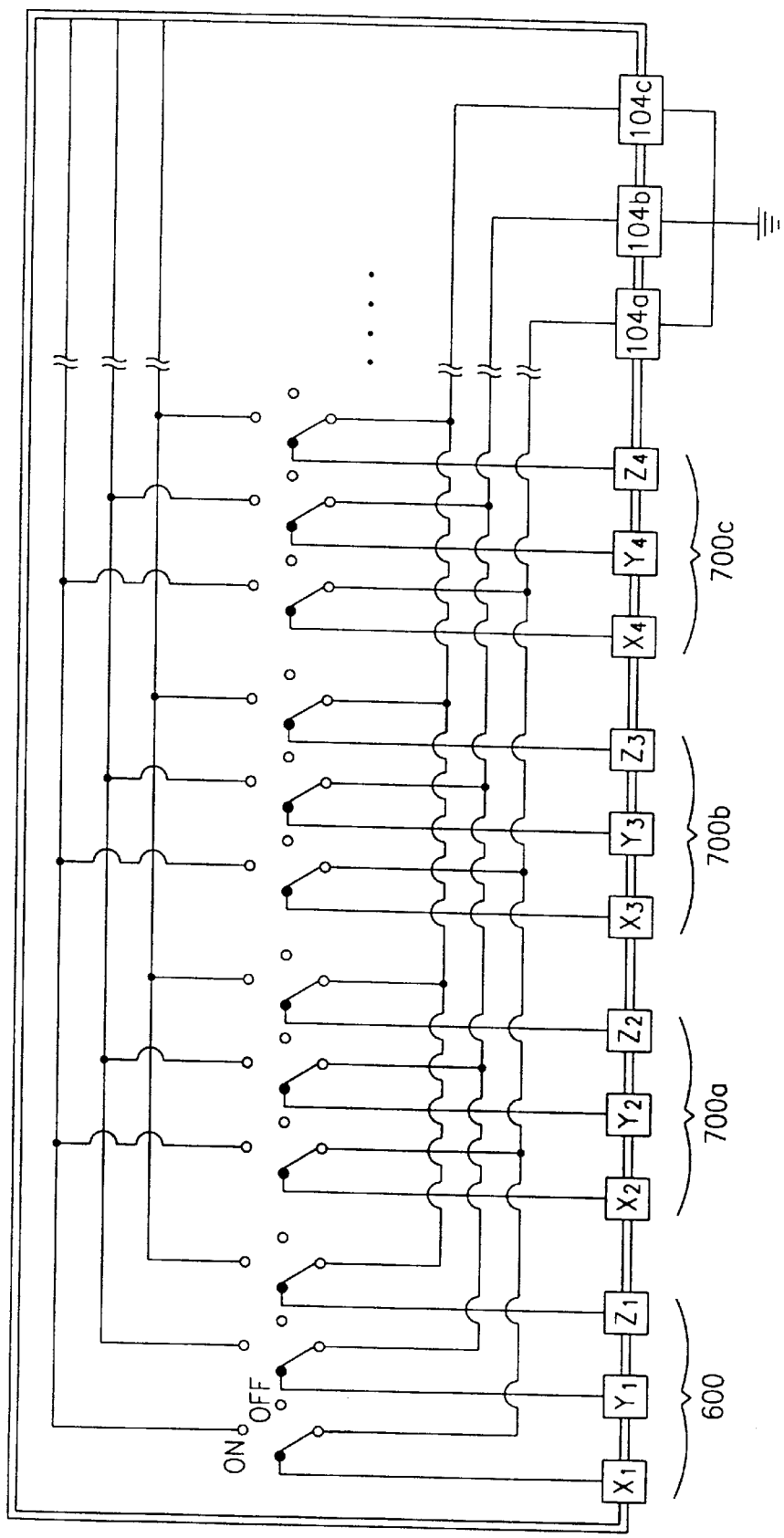
FIG. 11 is a circuit view illustrating the multi-circuit switch gear according to a first embodiment of the present invention.

With reference to FIG. 11, the circuit composition according to the first embodiment of the present invention will now be described.

First, the respective earth terminals of an X-phase input source $X_1$ of the input unit 600, an X-phase input source $X_2$ of the first output unit 700a, an X-phase input source $X_3$ of the second output unit 700b, and an X-phase input source $X_4$ of the third output unit 700c are connected to each other and coupled to the earth bushing 104a of the input unit.

The respective earth terminals of a Y-phase input source $Y_1$ of the input unit 600, a Y-phase input source $Y_2$ of the first output unit 700a, an Y-phase input source $Y_3$ of the second output unit 700b, and an Y-phase input source $Y_4$ of the third output unit 700c are connected to each other and coupled to the earth bushing 104b of the first output unit.

Also, the respective earth terminals of a Z-phase input source $Z_1$ of the input unit 600, a Z-phase input source $Z_2$ of the first output unit 700a, an Z-phase input source $Z_3$ of the second output unit 700b, and an Z-phase input source $Z_4$ of the third output unit 700c are connected to each other and coupled to the earth bushing 104c of the second output unit.

At this time, the 3-phase input and output units 600, 700a, 700b, 700c may be of a plurality of different kinds.

The multi-circuit switch gear according to the first embodiment of the present invention connects an identical phase to the input and output units 600, 700a, 700b, 700c, and the identical phase is coupled to the earth bushings 104a, 104b, 104c, wherein the earth bushings 104a, 104b, 104c are earthed underground by the moldcone connection member 800. Here, the earth bushing 104 is omitted.

Figure 12:
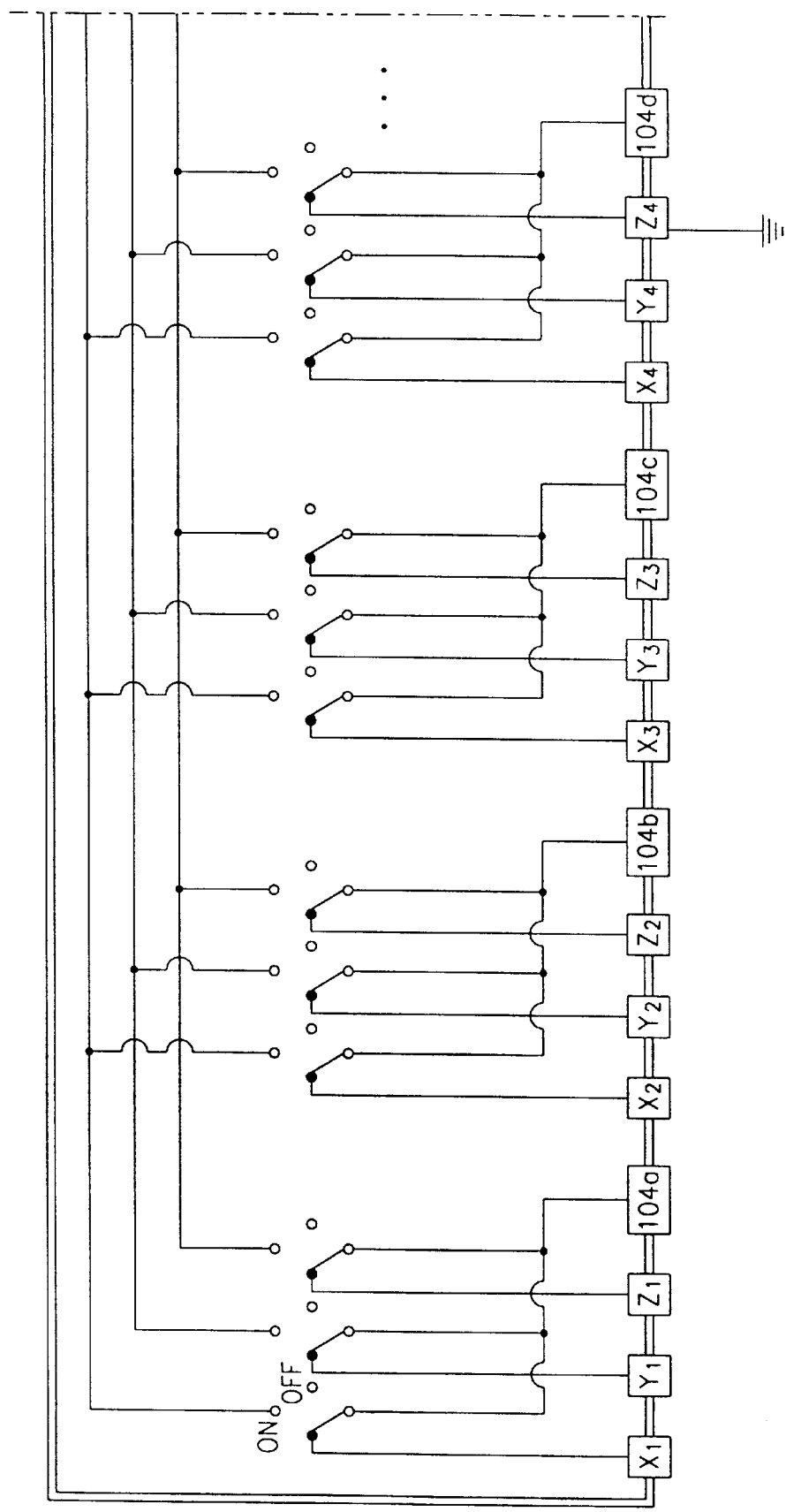
FIG. 12 is a circuit view illustrating the multi-circuit switch gear according to a second embodiment of the present invention.

As shown in FIG. 12, the multi-circuit switch gear according to the second embodiment of the present invention will now be described.

First, the input sources $X_1$, $Y_1$, $Z_1$, of the phases X, Y, Z in the input unit 600 are connected to each other and coupled to the earth bushing 104a of the input unit.

Then, the input sources $X_2$, $Y_2$, $Z_2$ of the phases X, Y, Z in the first output unit 700a are connected to each other and coupled to the earth bushing 104b of the first output unit.

Also, the input sources $X_3$, $Y_3$, $Z_3$ of the phases X, Y, Z in the second output unit 700b are connected to each other and coupled to the earth bushing 104c of the second output unit.

Then, the input sources $X_4$, $Y_4$, $Z_4$ of the phases X, Y, Z in the third output unit 700c are connected to each other and coupled to the earth bushing 104d of the third output unit.

Here, the 3-phase input and output units 600, 700a, 700b, 700c may be of a plurality of different kinds.

That is, the multi-circuit switch gear according to the second embodiment of the present invention allows the respective phases X, Y, Z for each of the input and output units 600, 700a, 700b, 700c to be coupled to a corresponding one of the earth bushings 104a, 104b, 104c, 104d which are then earthed underground by the moldcone connection member 800 in FIG. 8.

Figure 13:
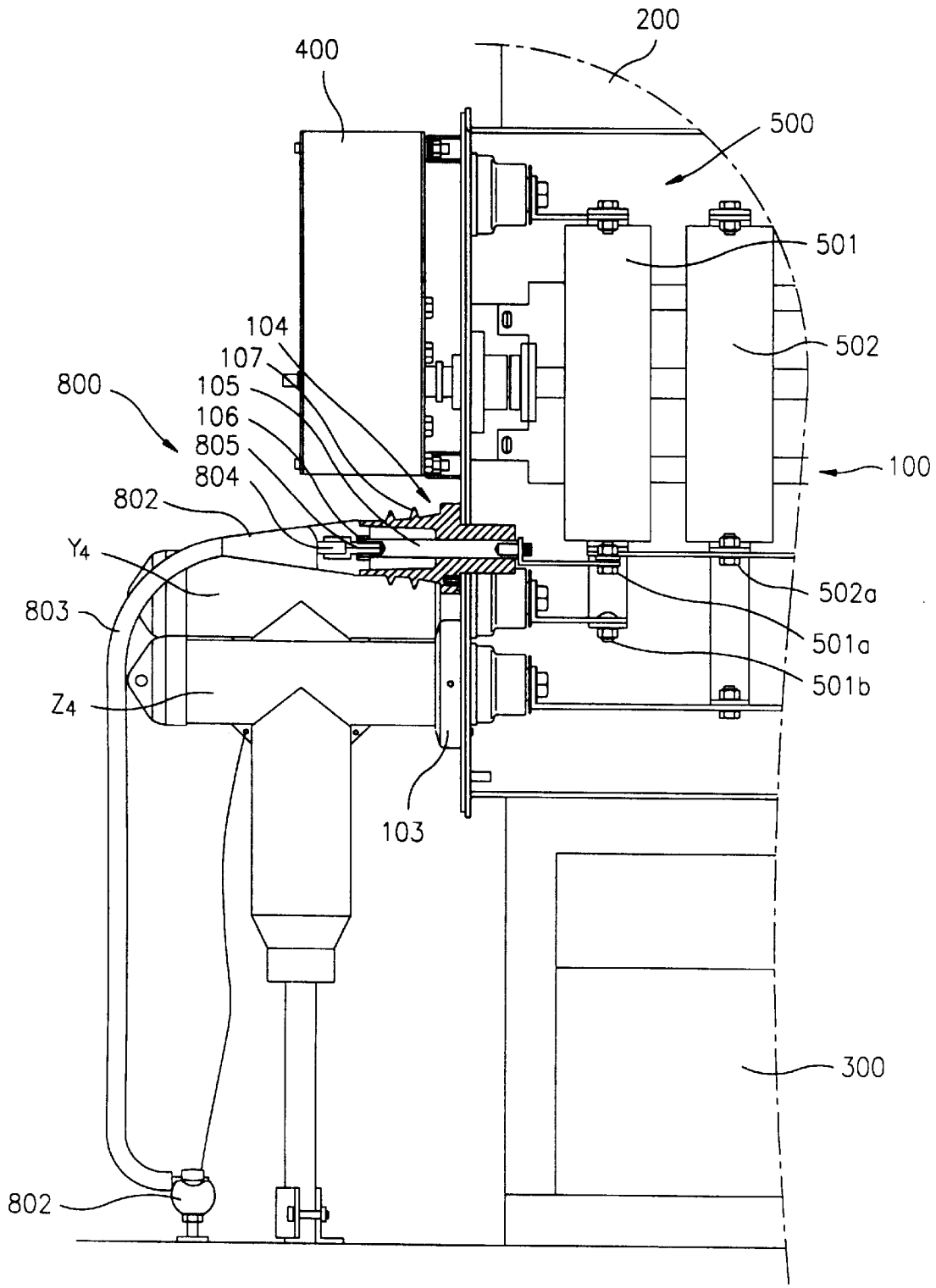
FIG. 13 is a partial side view illustrating an earth apparatus of the multi-circuit switch gear according to the present invention.
Figure 14:
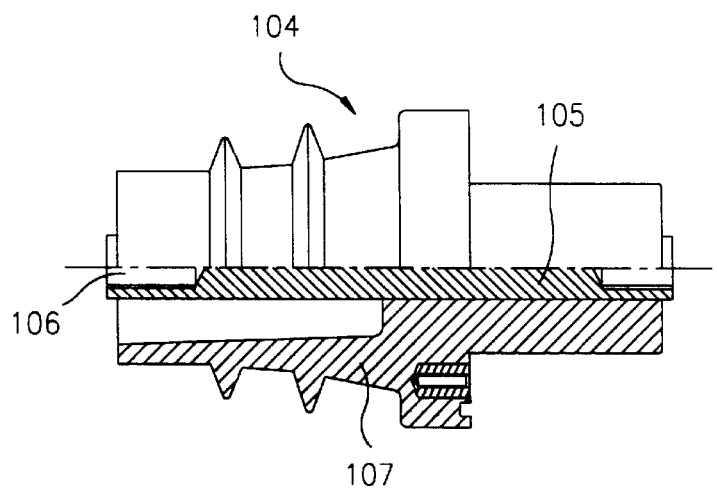
FIG. 14 is a partial cross-sectional view illustrating an earth bushing of the multi-circuit switch gear according to the present invention.
Figure 15:
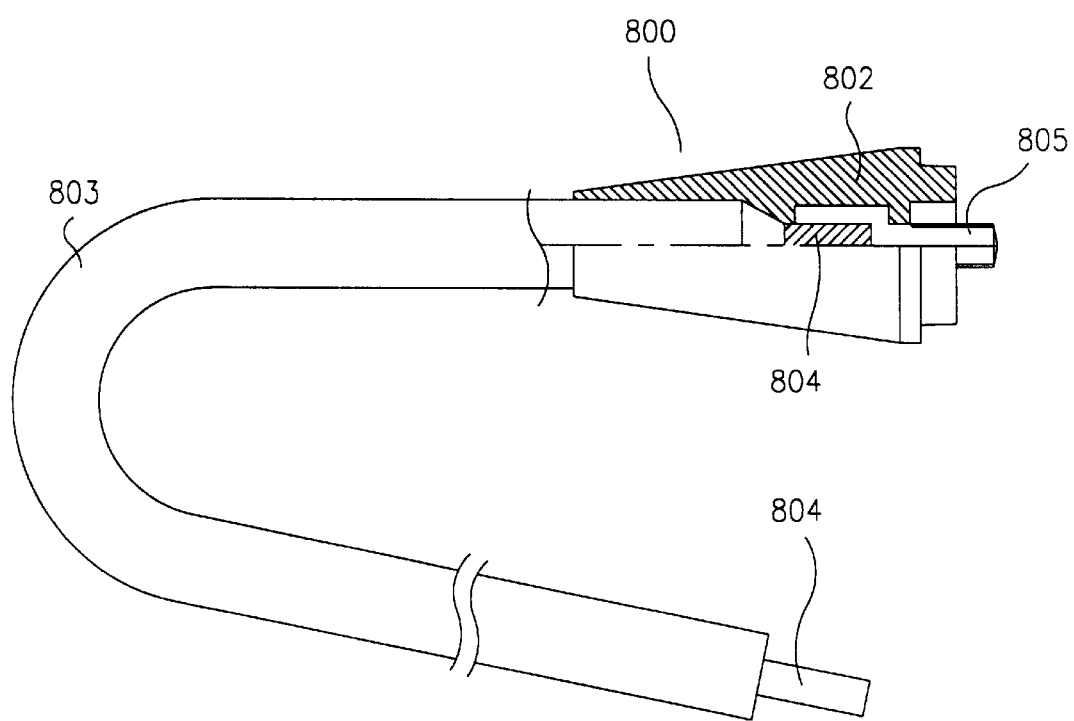
FIG. 15 is a partial cross-sectional view illustrating a terminal connection kit of the multi-circuit switch gear according to the present invention.

The moldcone connection member 800 through which the earth bushings 104a, 104b, 104c, 104d are earthed will now be explained with reference to FIGS. 13 through 15.

First, the earth bushing 104 (e.g., earth bushing 104a, 104b, 104c, 104d) which is externally extended from the switch gear and which is connected to earth contacts 501a, 502a of the 3-position switching device 500 in the switch gear, and there is provided the moldcone connection member 800 is connected to the earth bushing 104 by an end portion thereof, and is connected to the earth terminal 802 by another end portion thereof.

The connection bushing 104 is inserted into the earth bushing 104. A connection terminal 106 having a connection opening therein is formed in an end portion of the conductor 105. A bushing 107 formed of an epoxy resin surrounds the outer periphery of the conductor 105.

Meanwhile, to an end portion of the moldcone connection member 800 engaged to the earth bushing 104 there are sequentially connected an earth bushing connection unit 802 formed of moldcone material and an underground earth cable 803 which are inserted by a cable copper core 804.

A connection terminal 805 is inserted into the connection terminal 106 of the earth bushing 104 by being compressed to the cable copper core 804.

The earth operations with regard to maintenance, checkup and expansion in the multi-circuit switch gear according to the present invention will now be described.

When the automatic switching actuator 400 is manually operated for the earth operation, the 3-position switching device 500 in the main body 100 is moved from an off contact to the earth contact 507b, and an electrical discharging is executed in the insulation gas during the switching operation. After the switching operation, an electrical path is formed between the earth bushing 104 disposed outside the main body 100 and the contact point 507b. Then, through the moldcone connection member 800 connected to the earth bushing 104, the electrical path is earthed through the earth terminal 801 disposed on the bottom thereof.

Figure 16:
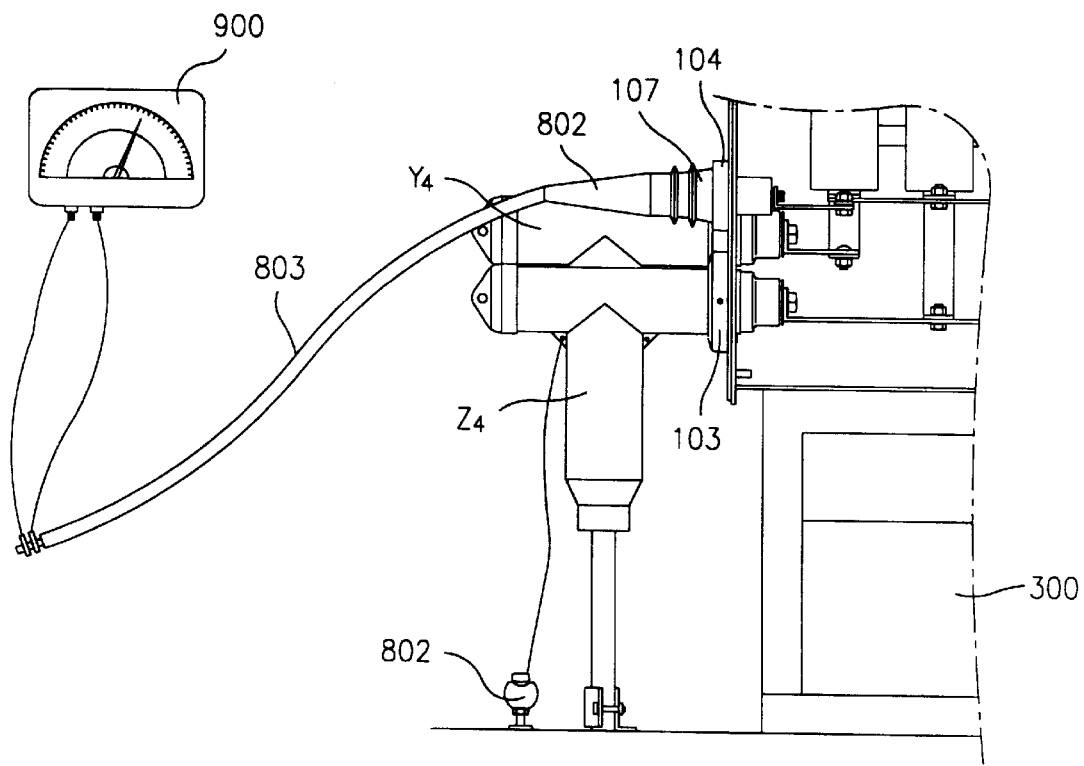
FIG. 16 is a view illustrating a state in which a test is taken using the terminal connection kit of the multi-circuit switch gear according to the present invention.

As shown in FIG. 16, in the multi-circuit switch gear according to the present invention, an insulation test is carried out with regard to the underground insulation cable 803. Here, a tester 900 is connected to an end portion of the moldcone connection member 800 connected to the earth terminal 801 of the bottom.

As described above, the multi-circuit switch gear according to the present invention allows a current discharge operation to occur in the insulation gas provided in the main body during the earthing operation, thereby securing workers' safety and facilitating an insulation test via the connection member with regard to the underground insulation cable.

As the present invention may be embodied in several forms without departing from the spirit of essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A multi-circuit switch gear, comprising:
   a main body filled with an insulation gas;
   a plurality of main bushings mounted on a front portion of the main body;
   a plurality of three-phase input/output units connected to the main bushings;
   a plurality of multi-position switching devices disposed inside the main body and connected to a constant power source bushing so as to correspond to the respective phases of the plurality of three-phase input/output units, each of the multi-position switching devices switching between at least three different states including a turn-on state, a turn-off state, and an earthed state for carrying out a switching operation;
   a plurality of switching actuators disposed at a front portion of the main body for actuating switching of the switching devices;
   a plurality of earth bushings mounted on side portions of the three-phase input/output units and connected to the respective phases of the input/output units;
   a plurality of moldcone connection members coupled to first end portions of the earth bushings; and
   a plurality of earth terminals connected to second end portions of the moldcone connection members and to a ground.

2. The switch gear of claim 1, further comprising:
   a viewing window formed adjacent to a side portion of each of the plurality of switching actuators for viewing respective operations of the multi-position switching devices in the main body.

3. The switch gear of claim 1, wherein in a circuit connected to the three phase input/output units and the earth bushings, identical phases in the respective input/output units are connected to each other and coupled to one of the earth bushings.

4. The switch gear of claim 1, wherein in a circuit connected to the three phase input/output units and the earth bushings, respective 3-phases in the respective input/output units are connected to one of the earth bushings.

5. The switch gear of claim 1, wherein each of the earth bushings comprises:
   a bushing formed of epoxy; and
   a conductor inserted into the bushing, an end portion of the conductor being connected to respective switch terminals of the multi-position switching devices, and another end portion of the conductor being formed of a connection terminal.

6. The switch gear of claim 5, wherein the connection terminal is formed of a female screw.

7. The switch gear of claim 1, wherein at least one of the moldcone connection members comprises:
   an earth bushing connection unit having a hole therethrough, an end portion of the earth bushing connection unit being formed of a moldcone material,
   an insulation cable having a hole therethrough, connected to the earth bushing connection unit and formed of the moldcone material;
   a cable copper core inserted through the respective holes of the earth bushing connection unit and the insulation cable; and
   a connection terminal compressed to a side portion of the cable copper core connected to a corresponding earth bushing.

8. The switch gear of claim 7, wherein the connection terminal is formed of a male screw.

9. The switch gear of claim 1, wherein each of the multi-position switching devices is a three-position switching device having first, second and third switch positions, the first switch position representing the turn-on state, the second switch position representing the turn-off state, and the third switch position representing the earthed stated.

10. The switch gear of claim 1, wherein each of the switching actuators includes an oil pressure cylinder operating in response to a control signal.

11. The switch gear of claim 10, further comprising:
    a control unit for generating the control signal to the switching actuators.

12. The switch gear of claim 10, wherein each of the multi-position switching devices includes:
    a control latch rotating in a clockwise or a counterclockwise direction according to the operation of the oil pressure cylinder.

13. The switch gear of claim 12, wherein the control latch includes a central shaft rotatable with the control latch.

14. The switch gear of claim 13, wherein each of the multi-position switching devices further includes:
    a movable contact member coupled to the central shaft of the corresponding control latch.

15. The switch gear of claim 14, wherein each of the multi-position switching devices further includes first and second contact terminals.

16. The switch gear of claim 15, wherein the movable contact member contacts the first contact terminal to place the switch gear in the turn-on state.

17. The switch gear of claim 15, wherein the movable contact member contacts the second contact terminal to place the switch gear in the earthed state.

18. The switch gear of claim 15, wherein the movable contact member is positioned horizontally between the first and second contact terminals to place the switch gear in the turn-off state.

* * * * *